US012473970B2

(12) United States Patent
Gassmann et al.

(10) Patent No.: US 12,473,970 B2
(45) Date of Patent: Nov. 18, 2025

(54) ELECTRIC DRIVE ARRANGEMENT FOR A VEHICLE

(71) Applicant: GKN Automotive Limited, Birmingham (GB)

(72) Inventors: Theodor Gassmann, Siegburg (DE); Ian Stone, Oxfordshire (GB); John Foulsham, Hampshire (GB); Daniel Beeby, Norfolk (GB)

(73) Assignee: GKN Automotive Limited, Birmingham (GB)

( * ) Notice: Subject to any disclaimer, the term of this patent is extended or adjusted under 35 U.S.C. 154(b) by 185 days.

(21) Appl. No.: 18/570,095

(22) PCT Filed: Jul. 30, 2021

(86) PCT No.: PCT/EP2021/071445
§ 371 (c)(1),
(2) Date: Dec. 14, 2023

(87) PCT Pub. No.: WO2023/006219
PCT Pub. Date: Feb. 2, 2023

(65) Prior Publication Data
US 2024/0271693 A1    Aug. 15, 2024

(51) Int. Cl.
*F16H 57/04*    (2010.01)
*B60K 1/00*    (2006.01)
(Continued)

(52) U.S. Cl.
CPC ........... *F16H 57/0476* (2013.01); *B60K 1/00* (2013.01); *F16H 57/0436* (2013.01);
(Continued)

(58) Field of Classification Search
CPC ...... H02K 9/19; H02K 7/116; F16H 57/0476; F16H 57/0456; F16H 57/045; F16H 57/0441; F16H 57/0436; F16H 57/0435; F16H 2061/0037; F16H 2057/02034; F15B 2211/31541; F15B 2211/20561; B60K 2001/006; B60K 1/00
(Continued)

(56) References Cited

U.S. PATENT DOCUMENTS 4,343,153 A * 8/1982 Kern .................... F15B 7/10
60/475
8,851,861 B2 * 10/2014 Frait ................ F16H 57/0445
417/216
(Continued)

FOREIGN PATENT DOCUMENTS

DE    10 2019 128 957 A1    4/2021
EP           3517335 A1    7/2019
(Continued)

OTHER PUBLICATIONS

International Search Report and Written Opinion for PCT/EP2021/071445 mailed Apr. 8, 2022 (10 pages).

*Primary Examiner* — Alex W Mok
(74) *Attorney, Agent, or Firm* — Reising Ethington P.C.

(57) ABSTRACT

An electric drive arrangement for a vehicle includes a housing, an electric machine, a transmission, and a hydraulic circuit for circulating a fluid to cool and lubricate the electric machine and the transmission.

16 Claims, 3 Drawing Sheets

(51) Int. Cl.
*H02K 7/116* (2006.01)
*H02K 9/19* (2006.01)

(52) U.S. Cl.
CPC ....... *F16H 57/0441* (2013.01); *F16H 57/045* (2013.01); *H02K 7/116* (2013.01); *H02K 9/19* (2013.01); *B60K 2001/006* (2013.01)

(58) Field of Classification Search
USPC .......................................................... 310/54
See application file for complete search history.

(56) References Cited

U.S. PATENT DOCUMENTS

| | | | |
|---|---|---|---|
| 10,272,767 | B1 | 4/2019 | Tang et al. |
| 10,414,363 | B2 * | 9/2019 | Kim ........................ F16N 25/00 |
| 2004/0124722 | A1 * | 7/2004 | Uchida .................... B60L 50/16 |
| | | | 903/952 |
| 2014/0234124 | A1 | 8/2014 | Gunter et al. |
| 2016/0230900 | A1 * | 8/2016 | Schulz .................. F15B 13/028 |
| 2017/0218833 | A1 * | 8/2017 | Mitteer ...................... F01P 7/14 |
| 2017/0227005 | A1 * | 8/2017 | Böhm ...................... F04C 15/06 |
| 2018/0045090 | A1 * | 2/2018 | Kiyokami ............... F01M 5/005 |
| 2018/0241288 | A1 | 8/2018 | Murakami et al. |
| 2019/0229582 | A1 | 7/2019 | Ito et al. |

FOREIGN PATENT DOCUMENTS

| | | | | |
|---|---|---|---|---|
| EP | 3627004 | A1 * | 3/2020 | ......... F16H 61/0021 |
| JP | 2021052521 | A | 4/2021 | |
| WO | 2015058788 | A1 | 4/2015 | |
| WO | 2020069744 | A1 | 4/2020 | |

* cited by examiner

ELECTRIC DRIVE ARRANGEMENT FOR A VEHICLE

CROSS-REFERENCE TO RELATED APPLICATIONS

This application is a national stage of, and claims priority to, Patent Cooperation Treaty Application No. PCT/EP2021/071445, filed on Jul. 30, 2021, which application is hereby incorporated herein by reference in its entirety.

BACKGROUND

From US 2019/0229582 A1, a vehicle drive device is known with a lubricating path including a first oil pump to pump an oil stored in a casing by the first oil pump and to supply the oil to a power transmission mechanism for lubricating the power transmission mechanism, and a cooling path that is separated from the lubricating circuit and provided for the rotating electric machine. The cooling path includes a second oil pump to pump the oil stored in the casing by the second oil pump to supply the oil exclusively to the rotating electric machine for cooling the rotating electric machine. The second oil pump is an electric oil pump, and the cooling path is provided with an oil cooler cooling the oil to be supplied to the rotating electric machine.

From WO 2020/069744 A1 an electric drive for driving a motor vehicle is known with a housing arrangement, an electric machine, a planetary unit and a power transmission unit. The housing arrangement has a first housing part on the motor side, a second housing part on the transmission side, and an intermediate housing part which separates a motor space and a transmission space from each other. The intermediate housing member has a motor-side casing portion extending axially into the outer casing portion of the first housing member, and a transmission-side casing portion extending axially into the second housing member. A sealed cavity for a coolant to flow through is formed between the outer surface of the motor-side casing portion and the inner surface of the first housing part.

Document WO 2015/058788 A1 discloses a drive assembly for a motor vehicle with a first gear and a second gear. The first gear and the second gear are drivingly connected to one another. A lubricant filling which, in a static built-in condition of the drive assembly, defines a lubricant level. A first reservoir is arranged above the lubricant level. The first reservoir can be filled with lubricant as a result of the rotation of the first gear. A second reservoir is arranged above the lubricant level. The second reservoir can be filled with lubricant as a result of the rotation of the second gear. The first reservoir serves to lubricate a first bearing region, whereas the second reservoir serves to lubricate a second bearing region of the drive assembly.

US 2018/241288A1 discloses a rotating electrical machine cooling structure where a cooling medium is supplied by a pump to a stator and rotor of a rotating electrical machine, thereby cooling the stator and rotor. The rotating electrical machine cooling structure comprising a first passage that supplies the cooling medium from the pump to the stator; a second passage that supplies the cooling medium from the pump to the rotor; and a valve that regulates a flow of the cooling medium of the first passage and a flow of the cooling medium of the second passage. A cooling state of the stator and a cooling state of the rotor are controlled by the valve.

U.S. Pat. No. 10,272,767 B1 discloses an electric drivetrain system that includes an electric drivetrain of an electric vehicle. The electric drivetrain includes an inverter component, a gearbox component and a motor component. A first cooling system uses ethylene glycol and water based coolant (EGW). The first cooling system comprises an EGW coolant loop to distribute the coolant through at least one of the inverter component, a housing of the gearbox component, and a housing of the motor component to remove heat from the inverter component, the housing of the gearbox component, and the housing of the motor component. A second cooling system uses oil based coolant. The second cooling system comprises an oil coolant loop to distribute the oil based coolant through at least one of internal components of the gearbox component and internal components of the motor component to remove heat from at least the internal components of the gearbox component, and from at least the internal components of the motor component. An oil coolant pump controls a flow of the oil based coolant through the oil coolant loop and a heat exchanger transfers heat from the oil coolant loop to the EGW coolant loop, away from the electric drivetrain, to a vehicle cooling system having a radiator.

EP 3 517 335 A1 discloses an electric vehicle including a power control unit, a driving motor, a first cooling channel fitted with a first pump that causes a first cooling liquid cooled in a first heat exchanger to flow through the power control unit and a second heat exchanger in this order and returns the fluid to the first heat exchanger, and a second cooling channel fitted with a second pump that causes a second cooling liquid cooled by the first cooling liquid in the second heat exchanger to flow through the driving motor and return to the second heat exchanger. The second pump starts or stops circulation of the second cooling liquid, or increases or reduces a circulation volume of the second cooling liquid, based on one or both of the temperature of the power control unit and the temperature of the first cooling liquid.

SUMMARY

Described herein is an electric drive arrangement for a vehicle with a housing, an electric machine, a transmission and a hydraulic circuit for circulating a fluid to cool and lubricate the electric machine and the transmission.

The electric machine and the transmission of the electric drive arrangement have different cooling and lubrication requirements, which depend on operation conditions. A performance of the electric machine is thermally limited in operation. Inherent losses may occur in the copper, iron and magnets of electric motors, where material properties limit the temperatures of the respective components and structures. Effective cooling is necessary to achieve adequate torque performance. A passive splash lubrication of the transmission results in churning losses under high-speed operation. The combination of cooling and lubrication for both the electric machine and the transmission is a compromise with regard to efficiency.

An electric drive for a vehicle is described with a hydraulic circuit for circulating a fluid for efficient cooling and lubrication of the electric machine and the transmission.

An electric drive arrangement for a vehicle, comprises:
a housing;
an electric machine with a stator connected to the housing and including stator end-windings, and a rotor with a rotor shaft rotatably supported in the housing;
a transmission to transmit a rotary movement from the rotor shaft to drive a driveline of the vehicle;

a hydraulic circuit for circulating a fluid to cool and lubricate the electric machine and the transmission, comprising an oil sump formed in a lower portion of the housing, a reservoir arranged above the oil sump, wherein the reservoir is configured to temporarily store and feed oil to rotating parts of the transmission, and a bi-directional pump which is hydraulically connected to the oil sump on a suction side, which is further hydraulically connected to the reservoir on a first pressure side and which is hydraulically connected to cooling nozzles of the electric machine on a second pressure side.

When the bi-directional pump is operated in a first direction of rotation, fluid is supplied to the reservoir, and when the bi-directional pump is operated in a second direction of rotation, fluid is supplied to the cooling nozzles for cooling the stator end-windings.

An advantage of the electric drive arrangement is that the bi-directional pump of the hydraulic circuit can be operated to optimize the cooling and lubrication of the electric machine and the transmission, depending on the actual cooling and lubrication requirements, by switching between the first and second direction of rotation. The first direction of rotation can advantageously be applied for high speed operation of the vehicle and accordingly high rotation speed of the rotor and the transmission parts. In high speed operation, the torque requirements of the electric machine are lower, so that spray cooling of the winding heads via the cooling nozzles is not required. Instead, lubrication of the transmission components running at high speed can advantageously be achieved by fluid supplied to the reservoir. A final drive of the transmission, for example, may still be passively splash lubricated. Due to the reduced oil level in the oil sump, churning losses are advantageously reduced.

The second direction of rotation can advantageously be applied for low speed operation of the vehicle and accordingly lower rotation speed of the rotor and the transmission parts, compared to the high speed mode. In low speed operation, high torque requirements are common, the high currents resulting in copper losses, so that the fluid supplied to the cooling nozzles can advantageously cool the stator end-windings, thus reducing the losses. A high-pressure spray cooling of the winding heads is provided when the bi-directional pump is operated in the second direction of rotation and the lubrication of the transmission in the low speed mode does not require active fluid supply. The passive splash lubrication of the transmission is effective under low speed conditions as churning losses are lower due to low rotation speeds.

The fluid circulated in the hydraulic circuit is a cooling and lubricating fluid, ,e.g., an oil. The oil sump is arranged to gather fluid, which drips off of the electric machine and the transmission due to gravitational force The lubricating fluid, despite the expression oil sump, is not limited to oil-based cooling and lubricating fluids.

According to an embodiment, the bi-directional pump is hydraulically connected via the reservoir to an inner diameter of the driveshaft and/or to the transmission. When the bi-directional pump is operated in the first direction of rotation, fluid is supplied to the inner diameter of the driveshaft and/or to the transmission. The active lubrication of the transmission does not require high-pressure fluid supply under high speed conditions and the electric machine can advantageously be supplied with low-pressure coolant fluid via the driveshaft, for example via radial bores of the driveshaft connecting the inner diameter with the rotor. The rotor is cooled and the fluid is further centrifuged toward the stator and the stator end-windings are thus also cooled.

According to a further embodiment, the bi-directional pump is hydraulically connected to a heat exchanger on the first pressure side and/or on the second pressure side to cool the fluid. The heat exchanger is, for example, a fluid/water heat exchanger. The first and second pressure sides can be hydraulically separated, each being connected to a heat exchanger. The two heat exchangers may be arranged as one integral part.

Alternatively, the first and second pressure sides can be hydraulically connected in a pressure side junction upstream of a single heat exchanger. A backflow of fluid between the first and second pressure sides is avoided by check valves arranged between the bi-directional pump and the pressure side junction. According to a further embodiment, the hydraulic circuit comprises a mode control valve hydraulically connected to the bi-directional pump on the first pressure side and on the second pressure side, a hydraulic stator path connecting the mode control valve with the cooling nozzles, and a hydraulic transmission path connecting the mode control valve with the reservoir. The bi-directional pump is hydraulically connected on the first pressure side via the mode control valve to the reservoir, whereas the bi-directional pump is hydraulically connected on the second pressure side via the mode control valve to the cooling nozzles.

According to a further embodiment, the mode control valve is a three-way two-position directional valve. The mode control valve can be hydraulically actuated via a pressure line. The pressure line is hydraulically connected to the bi-directional pump on the first pressure side. When the bi-directional pump is operated in the first direction of rotation, the first pressure side is pressurized to a first pressure level, which actuates the mode control valve such that the bi-directional pump is hydraulically connected on the first pressure side to the reservoir. A pressure control valve is arranged downstream of the hydraulic pressure line branch-off, which provides that the mode control valve is actuated by the built-up pressure before opening and allowing the fluid to flow from the first pressure side to the mode control valve. When the bi-directional pump is operated in the second direction of rotation, the second pressure side is pressurized to a second pressure level and the former first pressure side becomes the suction side of the bi-directional pump. When the pressure in the pressure line drops and the valve returns to its unactuated position, which can be achieved by a bias spring, such that the bi-directional pump is hydraulically connected on the second pressure side to the cooling nozzles.

When the bi-directional pump is operated in the first direction of rotation, the first pressure side is pressurized to the first pressure level to supply fluid for active cooling of the rotor and active lubrication of the transmission. A fluid level in the oil sump is advantageously reduced by supplying fluid to the reservoir. When the bi-directional pump is operated in the second direction of rotation, the second pressure side is pressurized to the second pressure level, which is higher than the first pressure level, to supply fluid to the cooling nozzles, while a fluid level in the oil sump is increased. According to a further embodiment, the reservoir is hydraulically connected to the oil sump and when the bi-directional pump is operated in the second direction of rotation fluid flows back from the reservoir to the oil sump.

According to a further embodiment, the reservoir is arranged inside the housing. According to an alternative embodiment, the reservoir is arranged external to the housing. The reservoir can at least partially be arranged above the rotor shaft.

According to a further embodiment, the electric drive arrangement may comprise a cooling arrangement to cool the fluid. The cooling arrangement is hydraulically connected to a suction side of the bi-directional pump. As the suction side is the respective non-active first or second pressure side of the bi-directional pump, the first and second pressure sides are connected in a suction side junction upstream of the bi-directional pump, which may be connected to the cooling arrangement. To prevent backflow from the respective active first or second pressure sides to the suction side, check valves are arranged between the bi-directional pump and the junction. The cooling arrangement includes:

- an inner casing portion and an outer casing portion of the housing, the inner casing portion and an outer casing portion forming a casing cooling structure through which a water based coolant is made to flow,
- a housing shield arranged radially outside of the outer casing portion and at least partially below a rotary axis of the rotor, thereby forming a shield cooling structure through which fluid can flow towards the oil sump.

The casing cooling structure including the coolant is hydraulically separated from the shield cooling structure for the fluid, thereby providing a heat exchange between the coolant and the fluid.

The shield cooling structure is arranged radially outside of the casing cooling structure and at least partially encases the casing cooling structure. The shield cooling structure advantageously allows a heat exchange between the water based coolant flowing through the casing cooling structure and the fluid flowing through the shield cooling structure. An additional suction side heat exchanger for cooling the fluid is thus provided, resulting in a more effective cooling of the fluid. The shield cooling structure being arranged below the rotary axis of the rotor allows gathering of the fluid used for cooling the rotor and the winding heads. The description below is to be understood with reference to the direction of gravity force with the electrical drive being in ready-to-operate installation. Accordingly, the housing shield can be arranged radially between the outer casing portion and the oil sump. The housing shield covers, for example a sector of at least 45° in circumferential direction of the rotary axis of the rotor.

To further enhance the heat exchange of the cooling arrangement, the shield cooling structure can comprise channels running generally in parallel in an axial direction. The channels advantageously provide a greater surface and thus improved heat transfer from the fluid to the shield cooling structure. Further, the channels allow use of both axial flow directions. Generally, the shield cooling structure may have a downward slope to provide a fluid flow due to gravity force, the fluid flowing for example towards an outlet passage from the shield cooling structure into the oil sump. Each channel may have the downward slope. The shield cooling structure may further comprise fins connected to the outer cooling casing and/or the housing shield. The fins also provide a greater surface and thus improved heat transfer from the fluid to the shield cooling structure.

BRIEF DESCRIPTION OF THE DRAWINGS

Exemplary embodiments and further advantages of the electric drive arrangement for a vehicle will be illustrated as follows with reference to the accompanying drawings.

DETAILED DESCRIPTION

Figure 1:
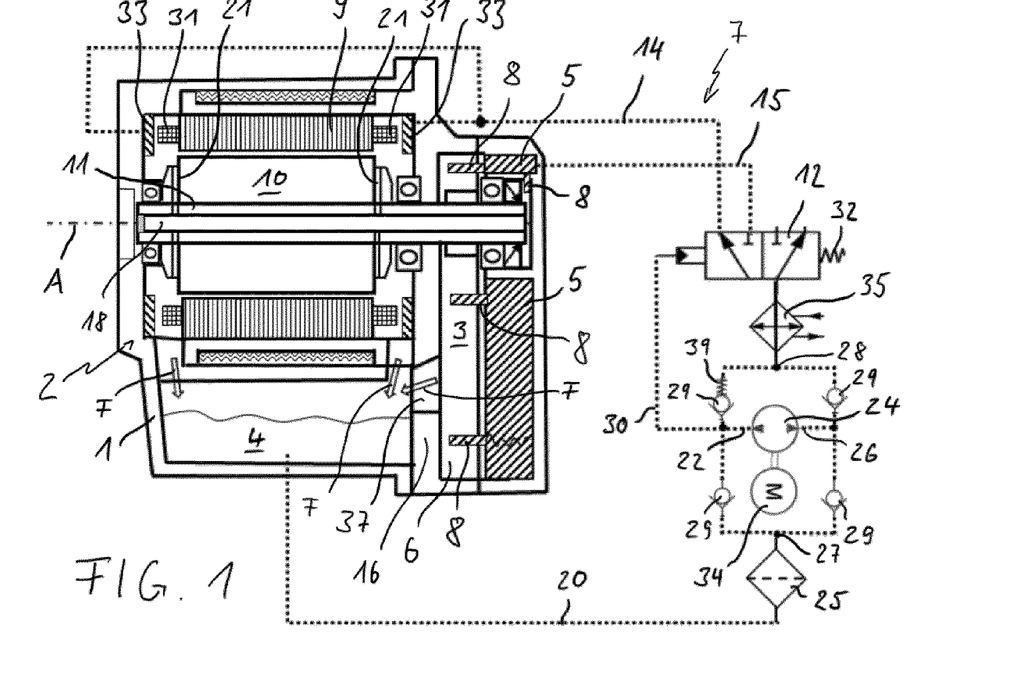
FIG. 1 shows a schematic illustration of an exemplary embodiment of the electric drive arrangement.

In FIG. 1, an electric drive arrangement for a vehicle is depicted, wherein a housing 1, an electric machine 2, a transmission 3, an oil sump 4 and a reservoir 5 are shown as a schematic representation of a longitudinal cut along a rotary axis A of a rotor 10 of the electric machine 2. The electric machine 2 has a stator 9 connected to the housing 1. The stator 9 includes stator end-windings 31. The rotor 10 is rotatable relative to the stator 9. A driveshaft 11 is connected to the rotor 10 and rotatably supported in the housing 1 about the axis of rotation A. The transmission 3 is adapted to transmit a rotary movement from the driveshaft 11 to drive a driveline of the vehicle, which is not depicted. The transmission 3 may comprise, for example, a reduction gear, a differential drive and a coupling, which are not depicted. A hydraulic circuit 7 for circulating a fluid to cool and lubricate the electric machine 2 and the transmission 3 is in part schematically depicted. The hydraulic circuit 7 comprises the oil sump 4 formed in a lower portion of the housing 1, the reservoir 5 arranged above the oil sump 4, and a bi-directional pump 24 which is hydraulically connected to the oil sump 4 on a suction side via a fluid supply line 20. The reservoir 5 is configured to temporarily store and feed fluid to rotating parts of the transmission 3. The bi-directional pump 24 is further hydraulically connected to the reservoir 5 on a first pressure side 22 and to the cooling nozzles 33 of the electric machine 2 on a second pressure side 26. When the bi-directional pump 24 is operated in a first direction of rotation, fluid is supplied to the reservoir 5, and when the bi-directional pump 24 is operated in a second direction of rotation, fluid is supplied to the cooling nozzles 33 for cooling the stator end-windings 31. The bi-directional pump 24 is further hydraulically connected via the reservoir 5 to an inner diameter 18 of the driveshaft 11 and to the transmission 3. When the bi-directional pump 24 is operated in the first direction of rotation, fluid is further supplied to the inner diameter 18 of the driveshaft 11 and to the transmission 3. In the depicted embodiment, the reservoir 5, which is arranged inside the housing 1 on the transmission side, comprises outlets 8 to supply fluid to bearings and gears of the transmission 3 and to the rotor 9 via the inner diameter 18 of the driveshaft 11. The fluid is administered via radial bores 21 of the driveshaft 11, the radial bores 21 connecting the inner diameter 18 with the rotor 10. The fluid is centrifuged along the rotor 10 towards the stator 9, and flows back into the oil sump 4 due to gravitational force, shown by arrows F.

The housing 1 includes an intermediate wall 16 separating the oil sump 4 on a motor-side of the housing 1 from a transmission sump 6 on a transmission-side of the housing 1. A passage 37 in the intermediate wall 16 allows fluid dripping off the transmission 3 to flow into the machine-side reservoir 5, as shown by arrow F. The fluid level in the transmission sump 6 can be higher during low speed operation to provide adequate splash lubrication, whereas during high speed operation, the fluid level in the transmission sump 6 is reduced to keep churning losses low.

A mode control valve 12 is hydraulically connected to both the first and second pressure sides 22, 26 of the bi-directional pump 24. The first and second pressure sides 22, 26 unite at a junction 28 downstream of the bi-directional pump 24. A check valve arrangement 29 prevents fluid flow from the respective active one of the first and second pressure sides 22, 26 to the non-active one. The mode control valve 12 is hydraulically actuated via a pressure line 30, which in this embodiment is hydraulically connected to the bi-directional pump 24 on the first pressure side 22. Thus, depending on the direction of rotation of the bidirectional pump 24 the mode control valve 12 is actuated between a first position and a second position. When the bi-directional pump 24 is operated in the first direction of rotation, the mode control valve 12 is actuated by the pressure in the pressure line 30 into the first position. The downstream check valve of the check valve arrangement 29 on the first pressure side 22 is biased towards its closed position by a check valve spring 39, which is adapted to keep the check valve closed to allow the pressure to build up in the pressure line 30 when the first pressure side 22 becomes the active one. In the first position, a hydraulic transmission path 15 connecting the mode control valve 12 with the reservoir 5 is hydraulically connected to the bi-directional pump 24 on the first pressure side 22. When the bi-directional pump 24 is operated in the second direction of rotation, the mode control valve 12 is not pressurized and thus actuated into the second position by a return spring 32. In the second position, a hydraulic stator path 14 connecting the mode control valve 12 to the cooling nozzles 33 is hydraulically connected to the bi-directional pump 24 on the second pressure side 26.

The two directions of rotation of the bi-directional pump 24 provide two modes for the hydraulic circuit 7, optimizing cooling and lubrication of the electric machine 2 and the transmission 3, depending on the operating conditions of the electric drive. The bi-directional pump 24 is driven by an electric motor 34. In the fluid supply line 20 upstream of the bi-directional pump 24, a suction filter 25 is arranged. Downstream of the suction filter 25, the fluid supply line 20 is split at a suction side junction 27 into two branches. The branches are connected to the first and second pressure sides 22, 26 of the bi-directional pump 24, respectively. When the suction side of the bi-directional pump 24 is the respective non-active first or second pressure side 22, 26 of the bi-directional pump 24, a backflow of fluid from the respective active first or second pressure sides 22, 26 to the suction side is avoided by the check valves 29 arranged between the bi-directional pump 24 and the suction side junction 27. On the first and second pressure sides 22, 26 of the bi-directional pump 24 the fluid is cooled in a heat exchanger 35 arranged upstream of the mode control valve 12.

Figure 2:
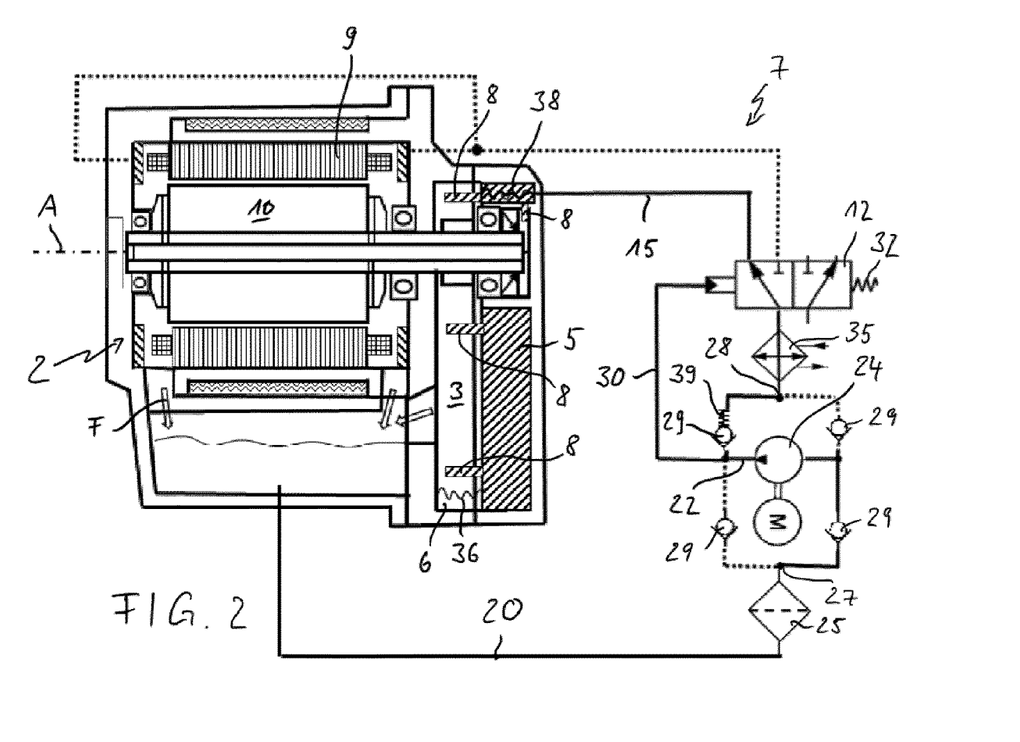
FIG. 2 shows the embodiment of FIG. 1 with operation of the bi-directional pump in a first direction of rotation.

The embodiment of the electric drive arrangement is now further described with regard to FIG. 2, which shows the electric drive arrangement of FIG. 1 with the bi-directional pump 24 being operated in the first direction of rotation. By reversing the pumping direction of the bidirectional pump 24 to the first direction of rotation, the the hydraulic circuit 7 provides lubrication and cooling fluid optimized for high speed operation of the electric machine 2. The downstream check valve 29 on the first pressure side 22 is biased towards its closed position by a check valve spring 39, which is adapted to keep the check valve 29 closed at the moment when the pumping direction is reversed, to build up a pressure in the pressure line 30. By pressurizing the first pressure side 22, the mode control valve 12 is actuated via the pressure line 30 against the biasing force of the return spring 32. The mode control valve 12 directs the fluid flow to the hydraulic transmission path 15. The check valves 29 establish a fluid flow from the supply line 20 through the bi-directional pump 24 towards the first pressure side 22 into the hydraulic transmission path 15, which flow is shown by full lines, whereas the dotted lines show inactive lines. Generally, crossing lines are not connected, unless otherwise stated or depicted by a dot. The first pressure side 22 is pressurized to a first pressure level to supply fluid for active cooling of the rotor 10 and active lubrication of the transmission 3. By supplying fluid to the reservoir 5, depicted by a high fluid level 38 in the reservoir 5, whereas a fluid level 36 in the transmission sump 6 is reduced.

Figure 3:
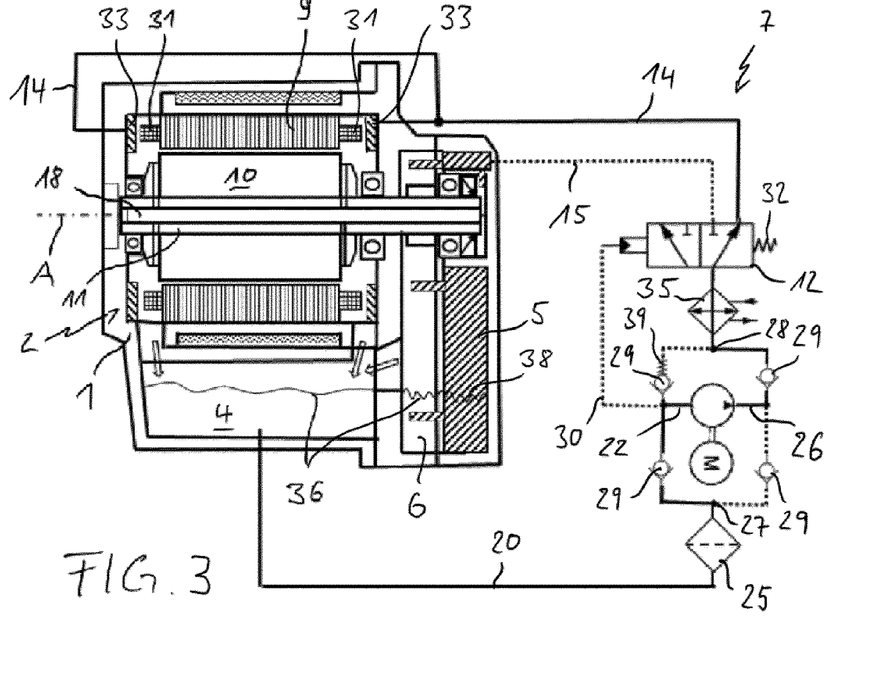
FIG. 3 shows the embodiment of FIG. 1 with operation of the bi-directional pump in a second direction of rotation.

The embodiment of the electric drive arrangement is now further illustrated with regard to FIG. 3, which shows the electric drive arrangement of FIG. 1 with the bi-directional pump 24 being operated in the second direction of rotation. The second pressure side 26 is pressurized to a second pressure level, which is higher than the first pressure level to supply fluid to the cooling nozzles 33, while a fluid level 36 in the transmission sump 6 is increased, e.g., to the fluid level in the in the oil sump 4. The reservoir 5 is hydraulically connected to the oil sump 4 to allow fluid to flow back from the reservoir 5 to the oil sump 4, resulting in a corresponding fluid level 38 in the reservoir 5. The hydraulic pressure line 30 is not pressurized by the bi-directional pump 24, as the first pressure side 22 now forms the suction side of the bi-directional pump 24. Thus the mode control valve 12 is actuated towards its second position by the return spring 32. The check valves 29 establish a fluid flow from the supply line 20 through the bi-directional pump 24 towards the second pressure side 26 and into the hydraulic stator path 14. The fluid is supplied to the cooling nozzles 33, which spray the fluid onto the winding heads 31 of the stator 9. From the stator 9 the fluid runs down by gravitational force towards the oil sump 4 as shown by arrows F. The hydraulic transmission path 15 is not pressurized and no fluid is actively transported to the transmission 3, which is splash lubricated from the transmission sump 6, which is sufficient for low speed operation of the vehicle and accordingly lower rotation speed of the rotor 10 and rotating parts of the transmission 3.

Figure 4:
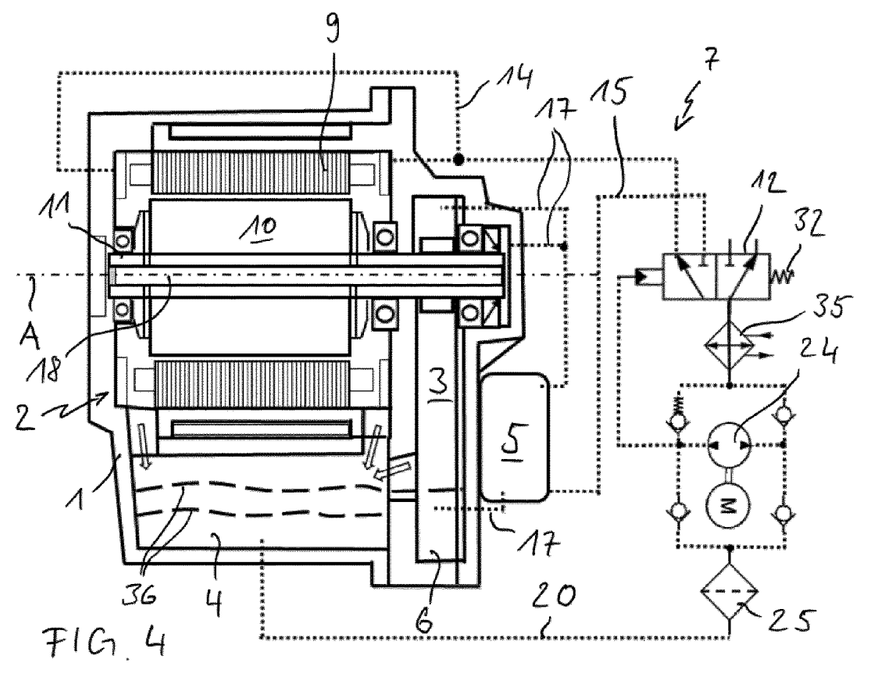
FIG. 4 shows a schematic illustration of a further exemplary embodiment of the electric drive arrangement.

In FIG. 4, a further exemplary embodiment of the electric drive arrangement is shown in a similar schematic illustration as the embodiment of FIG. 1. Identical parts are denoted with the same reference numerals. The electric drive arrangement according to this embodiment comprises the housing 1, the electric machine 2, the transmission 3 and the oil sump 4, which are not described in detail again. Reference is made to the description above.

The reservoir 5, however, is arranged outside the housing 1. The hydraulic circuit 7 for circulating the fluid to cool and lubricate the electric machine 2 and the transmission 3 comprises the oil sump 4 formed in a lower portion of the housing 1 and the external reservoir 5 arranged above the oil sump 4. The external reservoir 5 is configured to temporarily store and feed fluid to rotating parts of the transmission 3. The bi-directional pump 24 is hydraulically connected to the oil sump 4 on the suction side via the fluid supply line 20. The bi-directional pump 24 is further hydraulically connected to the external reservoir 5 on the first pressure side 22 and to the cooling nozzles 33 of the electric machine 2 on a second pressure side 26. When the bi-directional pump 24 is operated in the first direction of rotation, fluid is supplied to the external reservoir 5. When the bi-directional pump 24 is operated in the second direction of rotation, fluid is supplied to the cooling nozzles 33 for cooling the stator end-windings 31. The bi-directional pump 24 is further hydraulically connected via the external reservoir 5 and conduits 17 to the inner diameter 18 of the driveshaft 11 and to the transmission 3. In the depicted embodiment, the fluid is supplied through the conduits 17 from the external reservoir 5 to the bearings and gears of the transmission 3 and to the rotor 9 via the inner diameter 18 of the driveshaft 11. The fluid level 36 in the oil-sump 4 is depicted by two broken lines. The lower fluid level 36 appears when the bi-directional pump 24 is operated in the first direction of rotation and the higher fluid level 36 appears when the bi-directional pump 24 is operated in the second direction of rotation.

Figure 5:
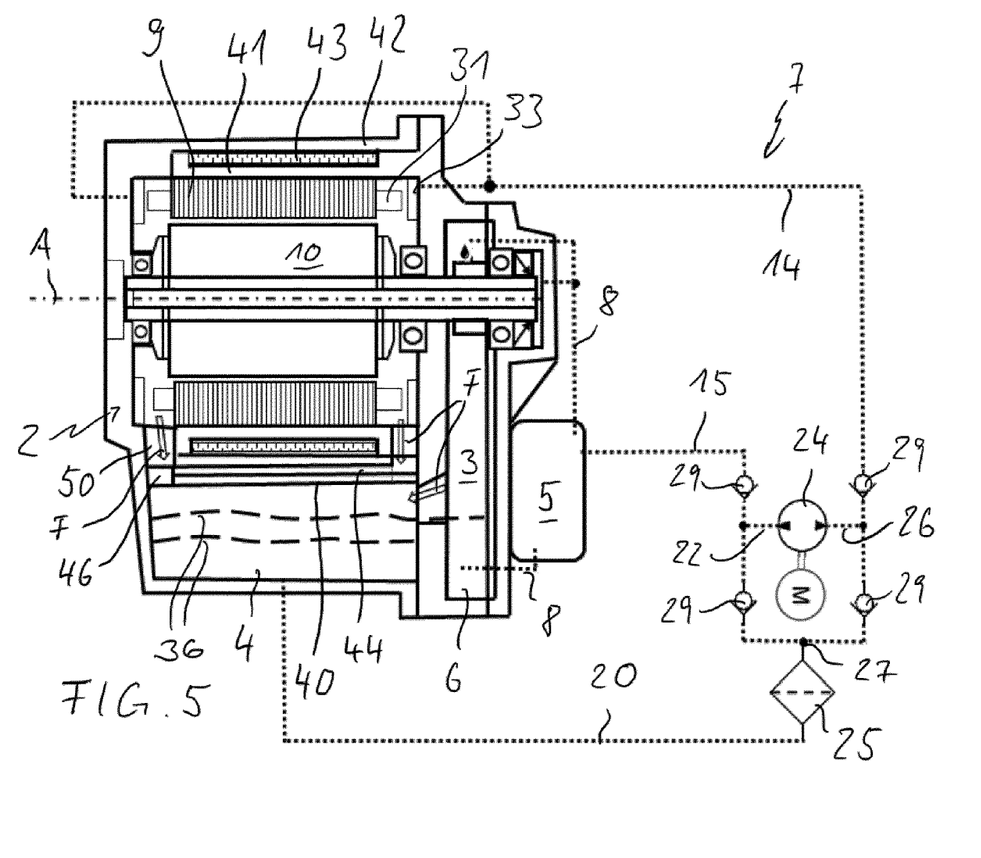
FIG. 5 shows a schematic illustration of a further exemplary embodiment of the electric drive arrangement.
Figure 6:
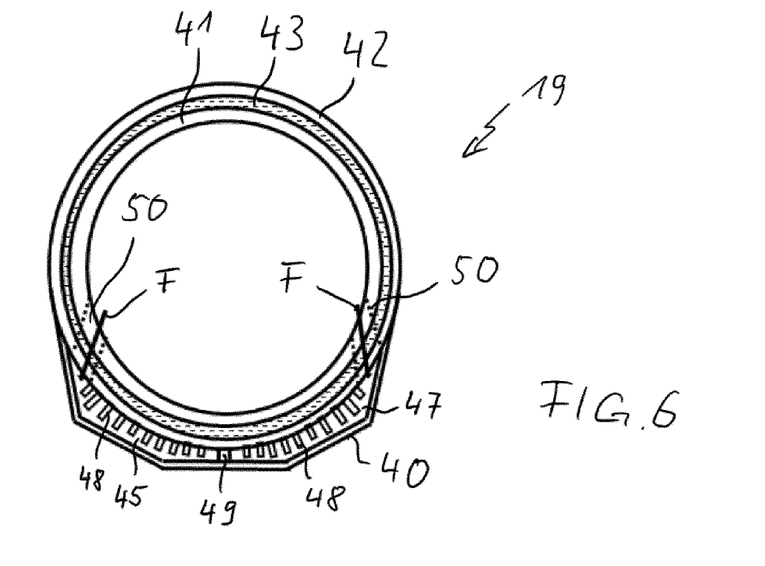
FIG. 6 shows a schematic cross-sectional view of the embodiment of FIG. 5.

In FIG. 5, a further exemplary embodiment of the electric drive arrangement is shown in a similar schematic illustration as the embodiment of FIG. 4. In FIG. 6, the embodiment of FIG. 5 is shown in a schematic cross section through housing 1 at an axial position of the electric machine 2. Parts of the electric machine 2 are not depicted. FIGS. 5 and 6 are described together. Identical parts are denoted with the same reference numerals. The electric drive arrangement according to this embodiment comprises the housing 1, the electric machine 2, the transmission 3, the oil sump 4, and the external reservoir 5, which are not described in detail again. Reference is made to the description above.

The hydraulic circuit 7 for circulating a fluid to cool and lubricate the electric machine 2 and the transmission 3 comprises the oil sump 4 formed in a lower portion of the housing 1, the external reservoir 5 configured to temporarily store and feed fluid to rotating parts of the transmission 3, and the bi-directional pump 24 which is hydraulically connected to the oil sump 4 on a suction side via a fluid supply line 20. In this embodiment, the bi-directional pump 24 is directly hydraulically connected to the reservoir 5 on the first pressure side 22 and to the cooling nozzles 33 of the electric machine 2 on the second pressure side 26. Thus, a mode control valve is not necessary to connect the first or second pressure side 22, 26 to the hydraulic transmission path 15 and the hydraulic stator path 14, respectively. A pressure side cooling of the fluid may be provided for one or both of the hydraulic transmission path 15 and the hydraulic stator path 14 by arranging one or two heat exchangers.

In the depicted embodiment, however, the electric drive arrangement comprises an alternative cooling arrangement 19 to cool the fluid. The cooling arrangement 19 is arranged at a suction side of the bi-directional pump 24. When the suction side is the respective non-active first or second pressure side 22, 26 of the bi-directional pump 24, the first and second pressure sides 22, 26 are connected at the suction side junction 27 upstream of the bi-directional pump 24, which is connected to the cooling arrangement 19. To prevent a fluid backflow from the respective active first or second pressure sides 22, 26 to the suction side, check valves 29 are arranged between the bi-directional pump 24 and the suction side junction 27. The cooling arrangement 19 includes an inner casing portion 41 and an outer casing portion 42 of the housing 1, the inner casing portion 41 and an outer casing portion 42 forming a casing cooling structure 43 through which a water based coolant is made to flow. A housing shield 40 is arranged radially outside of the outer casing portion 42 and at least partially below the rotary axis A of the rotor 10, thereby forming a shield cooling structure 44 through which fluid can flow towards the oil sump 4. The casing cooling structure 43 may similarly be arranged in the housings 1 of the earlier described embodiments. The casing cooling structure 43 including the coolant is hydraulically separated from the shield cooling structure 44 for the fluid, thereby providing a heat exchange between the coolant and the fluid. Advantageously, a suction side heat exchanger for cooling the fluid is thus provided, resulting in a less complicated hydraulic circuit 7, in which the heat exchanger on the pressure side and the mode control valve are omitted.

The shield cooling structure 44 arranged below the rotary axis A of the rotor 10 gathers fluid for cooling the rotor 10 and the winding heads 31. To further enhance the heat exchange of the cooling arrangement 19, the shield cooling structure 44 can comprise channels 45, 47 running generally in parallel in an axial direction. The channels 45, 47 advantageously provide a greater surface and thus improved heat transfer from the fluid to the shield cooling structure 44. Further, the channels 45, 47 allow to use both axial flow directions. Generally, the shield cooling structure 44 may have a downward slope to provide a fluid flow due to gravity force, the fluid flowing for example towards at least one outlet passage 46 from the shield cooling structure 44 into the oil sump 4, which is depicted by arrows F. Each channel 45, 47 may as well have the downward slope. The shield cooling structure 44 may further comprise fins 48 connected to the outer cooling casing portion 42 and/or the housing shield 40. The fins 48 also provide a greater surface and thus improved heat transfer from the fluid to the shield cooling structure 44. The oil flow through the shield cooling structure 44 is illustrated by arrows F. The water based coolant in the casing cooling structure 43 may flow through circumferential channels (not depicted) formed in the inner casing portion 41, thus forming a cross-flow heat exchanger. The shield cooling structure 44 can comprise first and second channels 45, 47 running generally in parallel in the axial direction. The first channel 45 can be separated from the second channel 47 by a wall 49, so that the oil can flow in the first channel 45 in the axial direction opposite to the oil flow in the second channel 47. The shield cooling structure 44 further comprises at least one inlet passage 50 to receive fluid from the rotor 10 inside the inner casing portion 41. The outlet passage 46 and the inlet passage 50 are arranged in the axial direction at opposite ends of the shield cooling structure 44. There can be two inlet passages 50 arranged at opposite ends of the shield cooling structure 44, the fluid flowing either through the first or the second channel 45, 47.

The fluid level 36 in the oil-sump 4 is depicted by two broken lines, wherein the lower fluid level 36 appears when the bi-directional pump 24 is operated in the first direction of rotation and the higher fluid level 36 appears when the bi-directional pump 24 is operated in the second direction of rotation.

The depicted parts and features of all the exemplary embodiments of the electric drive are schematic representations, which may deviate from engineering drawing standards. Regarding the function and technical details of the parts and features, the description takes precedence over the drawings.

REFERENCE NUMERALS

1 Housing
2 Electric machine
3 Transmission
4 Oil sump
5 Reservoir
6 Transmission sump
7 Hydraulic circuit 8 Outlet
9 Stator
10 Rotor
11 Driveshaft
12 Mode control valve
14 Hydraulic stator path
15 Hydraulic transmission path
16 Intermediate wall
17 Conduits
18 Inner diameter of the rotor shaft
19 Cooling arrangement
20 Fluid supply line
21 Radial bore
22 First pressure side
24 Bi-directional pump
25 Filter
26 Second pressure side
27 Suction side junction
28 Pressure side junction
29 Check valve arrangement
30 Pressure line
31 Stator end windings
32 Spring
33 Cooling nozzles
34 Electric motor
35 Heat exchanger
36 Fluid level
37 Passage
38 Fluid level
39 Check valve spring
40 Housing shield
41 Inner casing portion
42 Outer casing portion
43 Casing cooling structure
44 Shield cooling structure
45 First channels
46 Outlet passage
47 Second channels
48 Fins
49 Wall
50 Inlet passage
A Rotary axis
F Arrows

The invention claimed is:

1. An electric drive arrangement for a vehicle, comprising:
 a housing;
 an electric machine with a stator connected to the housing and including stator end-windings, and a rotor with a rotor shaft rotatably supported in the housing;
 a transmission to transmit a rotary movement from the rotor shaft to drive a driveline of the vehicle; and
 a hydraulic circuit for circulating a fluid to cool and lubricate the electric machine and the transmission, the hydraulic circuit comprising:
  an oil sump formed in a lower portion of the housing,
  a reservoir arranged above the oil sump, wherein the reservoir is configured to temporarily store and feed oil to rotating parts of the transmission, and
  a bi-directional pump which is hydraulically connected to the oil sump on a suction side, which is further hydraulically connected to the reservoir on a first pressure side and which is hydraulically connected to cooling nozzles of the electric machine on a second pressure side;
 wherein, operation of the bi-directional pump in a first direction of rotation supplies fluid to the reservoir, and operation of the bi-directional pump in a second direction of rotation supplies fluid to the cooling nozzles for cooling the stator end-windings.

2. The electric drive arrangement according to claim 1, wherein the bi-directional pump is further hydraulically connected via the reservoir to an inner diameter of the driveshaft and/or to the transmission, wherein, operation of the bi-directional pump in the first direction of rotation further supplies fluid to the inner diameter of the driveshaft and/or to the transmission.

3. The electric drive arrangement according to claim 1, wherein the bi-directional pump is hydraulically connected to a heat exchanger on the first pressure side and/or on the second pressure side.

4. The electric drive arrangement according to claim 1, wherein the hydraulic circuit comprises a mode control valve hydraulically connected to the bi-directional pump on the first pressure side and on the second pressure side, a hydraulic stator path connecting the mode control valve with the cooling nozzles and a hydraulic transmission path connecting the mode control valve with the reservoir.

5. The electric drive arrangement according to claim 4, wherein the mode control valve is hydraulically actuated via a pressure line hydraulically connected to the bi-directional pump on the first pressure side.

6. The electric drive arrangement according to claim 1, wherein operation of the bi-directional pump in the first direction of rotation pressurizes the first pressure side to a first pressure level to supply fluid for active cooling of the rotor and active lubrication of the transmission, and wherein supplying fluid to the reservoir reduces a fluid level in a transmission sump.

7. The electric drive arrangement according to claim 1, wherein operation of the bi-directional pump in the second direction of rotation pressurizes the second pressure side to a second pressure level, which is higher than the first pressure level, to supply fluid to the cooling nozzles and increases a fluid level in a transmission sump.

8. The electric drive arrangement according to claim 1, wherein the reservoir is arranged inside the housing.

9. The electric drive arrangement according to claim 8, wherein the reservoir comprises outlets to supply fluid to the inner diameter of the driveshaft and/or to the transmission.

10. The electric drive arrangement according to claim 1, wherein the reservoir is arranged external to the housing.

11. The electric drive arrangement according to claim 10, wherein the reservoir is hydraulically connected to the transmission via conduits to supply fluid to the inner diameter of the driveshaft and/or to the transmission.

12. The electric drive arrangement according to claim 1, wherein the reservoir is hydraulically connected to the oil sump, and wherein operation of the bi-directional pump in a second direction of rotation cause fluid to flow back from the reservoir to the oil sump.

13. The electric drive arrangement according to claim 1, wherein a suction side of the bi-directional pump is connected to a cooling arrangement to cool the fluid.

14. The electric drive arrangement according to claim 1, wherein the cooling arrangement includes:
 an inner casing portion and an outer casing portion of the housing, the inner casing portion and the outer casing portion forming a casing cooling structure through which a water based coolant is made to flow, and
 a housing shield arranged radially outside of the outer casing portion and at least partially below a rotary axis of the rotor, thereby forming a shield cooling structure through which fluid can flow towards the oil sump, wherein the casing cooling structure including the coolant is hydraulically separated from the shield cooling structure for the fluid, thereby providing a heat exchange between the coolant and the fluid.

15. An electric drive arrangement for a vehicle, comprising:
- a housing;
- an electric machine with a stator connected to the housing and including stator end-windings, and a rotor with a rotor shaft rotatably supported in the housing;
- a transmission to transmit a rotary movement from the rotor shaft to drive a driveline of the vehicle;
- a hydraulic circuit for circulating a fluid to cool and lubricate the electric machine and the transmission, comprising
- an oil sump formed in a lower portion of the housing,
- a reservoir arranged above the oil sump, the reservoir configured to temporarily store and feed oil to rotating parts of the transmission, and
- a bi-directional pump which is hydraulically connected to the oil sump on a suction side, is hydraulically connected to the reservoir on a first pressure side, and is hydraulically connected to cooling nozzles of the electric machine on a second pressure side;
- wherein operation of the bi-directional pump in a first direction of rotation supplies fluid to the reservoir, and operation of the bi-directional pump in a second direction of rotation supplies fluid to the cooling nozzles for cooling the stator end-windings,
- wherein the bi-directional pump is further hydraulically connected via the reservoir to an inner diameter of the driveshaft and/or to the transmission, and
- wherein operation of the bi-directional pump in the first direction of rotation supplies fluid to the inner diameter of the driveshaft and/or to the transmission.

16. An electric drive arrangement for a vehicle, comprising:
- a housing;
- an electric machine with a stator connected to the housing and including stator end-windings, and a rotor with a rotor shaft rotatably supported in the housing;
- a transmission to transmit a rotary movement from the rotor shaft to drive a driveline of the vehicle; and
- a hydraulic circuit for circulating a fluid to cool and lubricate the electric machine and the transmission, the hydraulic circuit comprising
  - an oil sump formed in a lower portion of the housing,
  - a reservoir arranged above the oil sump, wherein the reservoir is configured to temporarily store and feed oil to rotating parts of the transmission, and
  - a bi-directional pump which is hydraulically connected to the oil sump on a suction side, which is further hydraulically connected to the reservoir on a first pressure side and which is hydraulically connected to cooling nozzles of the electric machine on a second pressure side;
- wherein operation of the bi-directional pump in a first direction of rotation supplies fluid to the reservoir, and operation of the bi-directional pump in a second direction of rotation supplies fluid to the cooling nozzles for cooling the stator end-windings, and
- wherein the bi-directional pump is hydraulically connected to a heat exchanger on the first pressure side and/or on the second pressure side.

* * * * *